United States Patent
Fillo et al.

(10) Patent No.: US 12,018,786 B2
(45) Date of Patent: Jun. 25, 2024

(54) TWO-PART COUPLING

(71) Applicant: Relativity Space, Inc., Long Beach, CA (US)

(72) Inventors: Aaron J. Fillo, Glendale, CA (US); Joshua Percival Kaye, Los Angeles, CA (US); Joseph Mark Trafecanty, West Hills, CA (US); Richard Santiago Rosas, Huntington Park, CA (US); Ryan Doria Lim, Torrance, CA (US); Noah Eugene Sampiere Prochnow, Novato, CA (US); Xiangyu Luan, Chino Hills, CA (US)

(73) Assignee: Relativity Space Inc., Long Beach, CA (US)

( * ) Notice: Subject to any disclaimer, the term of this patent is extended or adjusted under 35 U.S.C. 154(b) by 0 days.

(21) Appl. No.: 17/850,869

(22) Filed: Jun. 27, 2022

(65) Prior Publication Data
US 2023/0417350 A1 Dec. 28, 2023

(51) Int. Cl.
*F16L 37/098* (2006.01)

(52) U.S. Cl.
CPC ................................. *F16L 37/0985* (2013.01)

(58) Field of Classification Search
CPC .. F16L 37/0985; F16L 37/098; F16L 37/0987
USPC ........................................ 285/322, 323, 319
See application file for complete search history.

(56) References Cited

U.S. PATENT DOCUMENTS

| | | | | |
|---|---|---|---|---|
| 2,727,759 | A * | 12/1955 | Elliott | F16L 29/02 137/614.04 |
| 3,455,579 | A * | 7/1969 | Puckett | F16L 37/0985 285/308 |
| 3,794,363 | A | 2/1974 | Schulz | |
| 4,875,711 | A * | 10/1989 | Watanabe | F16L 19/0231 285/86 |
| 5,046,763 | A * | 9/1991 | Martucci | F16L 37/138 285/322 |
| 5,407,236 | A * | 4/1995 | Schwarz | F16L 37/098 285/23 |
| 5,806,898 | A * | 9/1998 | Hollnagle | F16L 37/098 285/86 |

(Continued)

OTHER PUBLICATIONS

"Owner's Manual, 14 U.S. Gallon/53 Liter Wet/Dry Vac", 48 pages, Emerson 2018, Mexico.

*Primary Examiner* — David Bochna
(74) *Attorney, Agent, or Firm* — Sterne, Kessler, Goldstein & Fox P.L.L.C.

(57) ABSTRACT

A two-part coupling for use in joining sections of pipe without additional fasteners is disclosed. The two-part coupling includes integral coupling features molded by additive manufacturing technology. The two-part coupling increases reliability, reduces weight, and provides ease of manufacture. The coupling distributes a fluid load so that the coupling can withstand pressures and leak rates in accordance with stringent standards. The two-part coupling can be coupled and de-coupled using a locking and release mechanism built into the integral parts. Assembly is made easier because the geometry of the coupling is amenable to additive manufacturing. Because the two-part coupling requires a lesser degree of precision, machined parts are not required.

17 Claims, 9 Drawing Sheets

(56) References Cited

U.S. PATENT DOCUMENTS

| | | | |
|---|---|---|---|
| 6,338,506 B1* | 1/2002 | Kubota | F16L 37/138 |
| | | | 285/322 |
| 8,480,134 B2 | 7/2013 | Crompton et al. | |
| 8,490,337 B2 | 7/2013 | Word, III et al. | |
| 8,827,321 B2* | 9/2014 | Defilippi | F02M 21/0212 |
| | | | 285/322 |
| 2005/0242580 A1* | 11/2005 | Mancinelli | F16L 37/098 |
| | | | 285/305 |
| 2010/0194104 A1* | 8/2010 | Hennemann | F16L 37/088 |
| | | | 285/330 |

* cited by examiner

TWO-PART COUPLING

BACKGROUND

Pipes and tubes serve as conduits for all types of fluids, including liquids, gases, and ionized gas (plasma) throughout many different forms of infrastructure and many different industries. For example, piping and tubing systems are used in water delivery and waste systems, buildings, heating and cooling (HVAC) systems, vehicles, pumps, medical facilities, laboratories, factories, and aerospace platforms, among other applications. Typical pipe and tube materials include cast, forged, or extruded metals (like iron, copper, and steel), nylon, fiberglass, carbon fiber, and plastics (like polyvinyl chloride (PVC), or cross-linked polyethylene (PEX)). PTFE (Teflon), one of the most non-reactive materials available, is highly desirable for tubing in extreme conditions such as corrosive environments under elevated temperature and pressure. Piping systems have introduced additional parts as fasteners, or joining elements, at the points connecting two pipes together. One type of coupling uses flanges circumferentially extending from the ends of pipes. Such a flange is a collar or other structure used to facilitate attachment of one object to another object, and these flanges are joined and reversibly held together with nut-and-bolt arrangements. Such flanges can serve to attach linear segments or segments with varying geometries such as tees, valves, or elbows.

There are drawbacks to the foregoing methods of joining two pipes, however. For example, the point at which two pipes are joined together by a coupling, flange, joint, or other mating element is a potential point of failure. A leak is especially likely to occur at such a point of failure. Further, each new part and material that is introduced for assembly into a piping system, along with tools required for installation and testing, adds to the system's complexity and carries a further risk of failure. Yet another drawback of other methods is the irreversibility of joining. Some methods of joining, such as solder joints or welded joints, are irreversible because the solder or weld must be broken to separate joined pipes. A need remains for improved structures and methods for joining two pipes that address some or all of these drawbacks.

BRIEF DESCRIPTION OF THE DRAWINGS

Aspects of the present disclosure are best understood from the following detailed description when read with the accompanying figures. Illustrated features may not be not drawn to scale and/or varied for clarity of discussion.

DETAILED DESCRIPTION

Figure 1A:
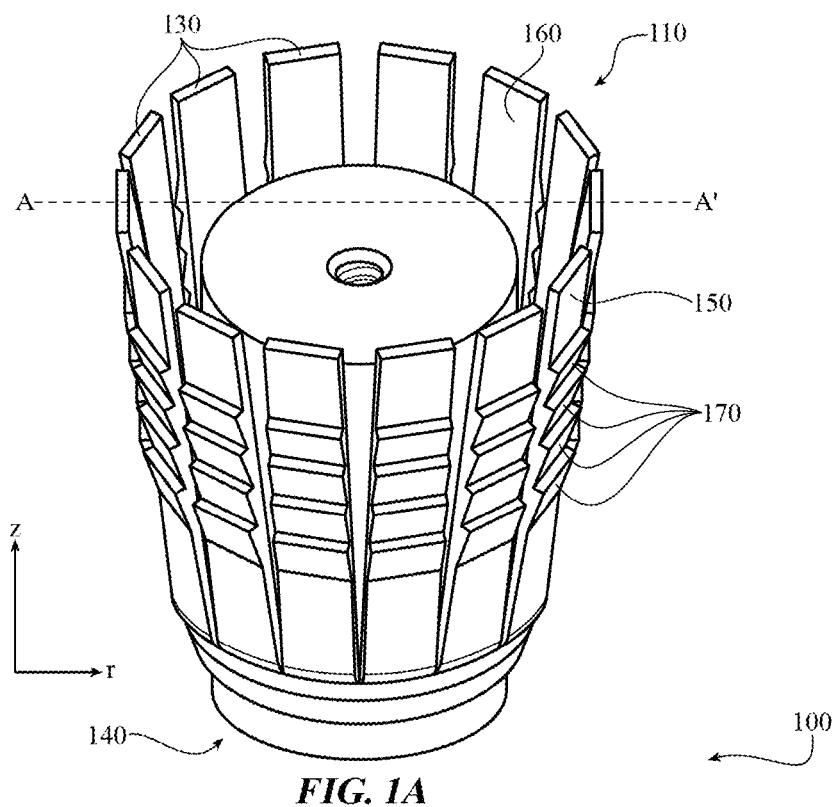
FIGS. 1A and 1B are perspective views of two parts of a coupling, in accordance with some embodiments of the present disclosure.

The following disclosure provides different embodiments, or examples, for implementing different features of the provided subject matter. Specific examples of components and arrangements are described below to simplify the present disclosure. These are merely examples and are not intended to be limiting. For example, the formation of a first feature on a second feature in the description that follows can include embodiments in which the first and second features are formed in direct contact, and can also include embodiments in which additional features can be formed that are between the first and second features, such that the first and second features are not in direct contact.

Further, spatially relative terms, such as "beneath," "below," "lower," "above," "upper," and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments of the present disclosure, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art in light of the teachings herein.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventors, and thus, are not intended to limit the claims in any way.

Terminology

The following definitions are provided to aid those skilled in the art in understanding the detailed description.

The term "fastener" means any of various devices for irreversibly or reversibly holding together two objects or parts. "Fasteners," as used herein, can include, for example, threaded bolts, collars, flanges, pressure fittings, solder joints, welded joints, and the like.

In this application, the term "reversibly" is given its ordinary meaning and includes capability of reestablishing the original condition of two pipes after joining them without permanently breaking or damaging the joint in the process. Two pipes joined with a welded or soldered joint are not reversibly joined because the weld or solder must be permanently broken or damaged in the process of separating the pipes.

The term "seal" is given its ordinary meaning and includes a member, such as an o-ring, that facilitates a substantially fluid-tight relationship between two components when the components are joined.

EXAMPLE EMBODIMENTS

To simplify the design, manufacture, and assembly of pipes and pipe joints, a two-part coupling is disclosed that needs no additional fasteners. The two-part coupling includes integral coupling features, that is, the coupling features are molded into each part of the two-part coupling. It will be appreciated that the geometry of various embodiments of the present invention is well suited to additive manufacturing technology. Specifically, embodiments of the invention can be made without a sealed cavity and with no part overhanging any other part horizontally. With the use of additive manufacturing, an engineer can specify a complex design and material as inputs to a 3-D printer. The 3-D printer then forms the parts of the coupling, having integral coupling features, from the powdered raw material by building up layers of the material and fusing the layers together using a focused energy source.

In an embodiment of the present invention, no clamps, bolts, or other type of fasteners are used beyond those integrated into the two-part coupling. Indeed, an embodiment of the present invention reduces the number of parts in a coupling compared with designs that use such additional fasteners.

Embodiments include the inventive recognition of advantages to reducing the number of parts of a coupling used to join sections of a pipe or work piece. For example, the inventors recognized that, in addition to improving reliability and simplifying the manufacturing process using additive manufacturing, the weight of the coupling can be reduced while maintaining equivalent pressure and flow performance.

The two-part coupling as described herein distributes a fluid load evenly so that the coupling can withstand pressures and leak rates in accordance with standards or other requirements of a particular application. In an example embodiment, a two-part coupling 100 made of Nylon 12 withstands pressures of 100 pounds per square inch (PSI) and 150 PSI boost pressure according to American Society of Mechanical Engineers (ASME) B 16.5 Class 150 standards governing couplings.

At least one embodiment of the present invention includes the inventive realization that some additive manufactured parts have greater design freedom than machined parts and they can require less, or no, additional machining during assembly. Another factor is that ingredients in the raw material, e.g., a metallic powder, can be modified in a controlled fashion to alter properties of the coupling as desired, while still using the same 3-D printer. In addition, the two-part coupling can be coupled and de-coupled using a locking and release mechanism built into the integral parts. Further, the geometry of various embodiments of the present invention, e.g., locking arms in a substantially sawtooth configuration, can be advantageously implemented using additive manufacturing without secondary machining.

Figure 1B:
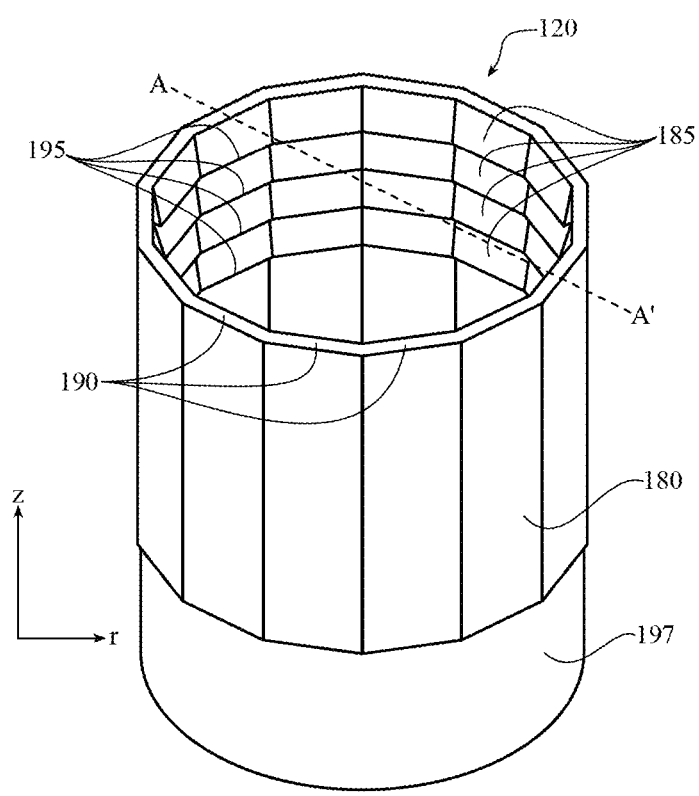

Turning now to the figures, FIGS. 1A and 1B show a two-part coupling 100, according to one embodiment of the present invention. Two-part coupling 100 has two parts that join together: an insertable coupling 110 and receiving coupling 120 that are adapted to be connected to one another via engaging structures integrated into their respective surfaces. In some embodiments, one or both of insertable coupling 110 and receiving coupling 120 are substantially cylindrical. In this embodiment, insertable coupling 110 fits into receiving coupling 120 as shown in the drawings. In alternate embodiments having modified surfaces from those shown in the drawings, insertable coupling 110 can fit over receiving coupling 120.

In the embodiment of FIGS. 1A and 1B, a plurality of circumferential cantilevered members 130, integral to insertable coupling 110, extend out from a base portion 140 thereof. One end of each of the circumferential cantilevered members 130 is attached to the insertable coupling 110, extending from the insertable coupling 110, and is free at the other end. Each one of circumferential cantilevered members 130 has an exterior surface 150 and an interior surface 160. Each one of circumferential cantilevered members 130 can be formed with an integral retention feature that includes, as elements thereof, a plurality of sawtooth features 170 (four shown), arranged on exterior surface 150 along its length. In this embodiment, circumferential cantilevered members 130 are flexible and can be radially compressed and released, while receiving coupling 120 is rigid. Radial compression of circumferential cantilevered members 130 tends to close gaps therebetween to form a continuous, cylindrical insertable coupling 110. In alternate embodiments, receiving coupling 120 can be flexible, while circumferential cantilevered members 130 remain rigid. In some embodiments, sawtooth features 170 can be arranged on interior surface 160 instead of exterior surface 170. It will also be appreciated that a variety of different structures can be used to serve as a retention feature in various embodiments of the present invention, including interlocking convex and concave surfaces.

It will be appreciated that the cylindrical embodiments depicted in the figures are only examples. The geometry of the coupling 100 could be another polygonal shape. For example, the coupling 100 could have a shape such a square, rectangular, oval, hexagonal, or an idiosyncratic curved shape.

In the embodiment of FIGS. 1A and 1B, receiving coupling 120 is formed in the shape of a hollow cylinder sized to accept insertion of insertable coupling 110. Receiving coupling 120 has an exterior surface 180 and an interior surface 185. One or both of exterior surface 180 and interior surface 185 can be fluted so as to form a plurality of flat circumferential sections 190 in this embodiment. Alternatively, receiving coupling 120 can be cylindrical, without fluting, while exterior surfaces of circumferential cantilevered members 130 are convex. Upon radial compression of circumferential cantilevered members 130, sliding insertable coupling 110 into receiving coupling 120, and subsequent release of the radial compression, flat circumferential sections 190 will match up, and engage, with circumferential cantilevered members 130 to achieve a tight fit between the two engagement surfaces of two-part coupling 100, thus creating a primary retaining feature of two-part coupling 100.

In particular, upon mating insertable coupling 110 with receiving coupling 120 by sliding insertable coupling 110 into receiving coupling 120, angled teeth of sawtooth features 170 in insertable coupling 110 interlock with corresponding detent structures 195 in receiving coupling 120 to secure insertable coupling 110 in place, within receiving coupling 120. In this embodiment, sawtooth features 170 and corresponding detent structures 195, respectively, function in a similar way to a ratcheting mechanism such as a tie-wrap, in that additional sawtooth features 170 and corresponding detent structures 195 interlock with one another as insertable coupling 110 is inserted farther into receiving coupling 120. As each additional sawtooth feature 170 engages with the corresponding detent structures 195 of the receiving coupling 120, the force required to withdraw the insertable coupling 110 from the receiving coupling 120 is greater. Furthermore, once insertable coupling 110 is secured in receiving coupling 120, the interlocking sawtooth features provide additional retaining force if there is an attempt to pull insertable coupling 110 out of receiving coupling 120. Such behavior is due to the circumferential cantilevered members 130 remaining under compression while insertable coupling 110 is joined to receiving coupling 120. Because the interlocking sawtooth features provide such strong engagement, some embodiments require no additional fasteners to secure the two elements of two-part coupling 100.

It will be understood that in an embodiment depicted in FIGS. 1A and 1B, when the two-part coupling 100 is fully assembled, the cantilevered members 130 put the assembly in compression such that the primary failure mode will be buckling of cantilevered members 130 or compression of the teeth.

In the embodiments of FIGS. 1A and 1B, outside surface 180 is partially fluted such that flat circumferential sections 190 do not extend through the whole length of receiving coupling 120. Accordingly, a lower portion 197 of outside surface 180 can have a smooth surface instead of a fluted surface. In other embodiments, outside surface 180 can be smooth, without fluting.

In some embodiments, insertable coupling 110 and receiving coupling 120 can be individually fabricated by additive manufacturing, using additive manufacturing system 900 as described below, from a raw material 920 in the form of a metal powder. Alternatively, insertable coupling 110 and receiving coupling 120 can be formed by additive manufacturing, using additive manufacturing system 900, from a powdered form of another suitable material, for example, nylon, polyvinyl chloride (PVC), plastic, fiberglass, carbon fiber, or the like. Further, it will be appreciated that a metal alloy, such as a nickel alloy of the type manufactured by Haynes International, can be used advantageously to create an embodiment of the present invention.

Two-part coupling 100 as described above can be used in many different applications, both generic and specialized, such as, for example, joining pipes containing water, fuel, coolant, cryogenic fluids, gases under pressure, or joining portions of an object. In some embodiments, two-part coupling 100 can be used as an exhaust port for a vehicle, a pump, or other equipment. In some other embodiments, receiving coupling 120 can be used as a receiving coupling for a valve disposed within insertable coupling 110.

In some embodiments, the insertable coupling 110 and receiving coupling 120 can be integrally formed with larger sections. In other embodiments, the insertable coupling 110 and receiving coupling 120 can each be joined to larger components, for example by welding.

It will be appreciated that one advantage of an embodiment of the present invention is that the assembled insertable coupling 110 and receiving coupling 120 can be disassembled by compressing circumferential cantilevered fingers 130 toward the center of insertable coupling 110 simultaneously so as to disengage sawtooth features 170 from corresponding detent structures 195. This advantage allows insertable coupling 110 and receiving coupling 120 to be reversibly joined.

Figure 2:
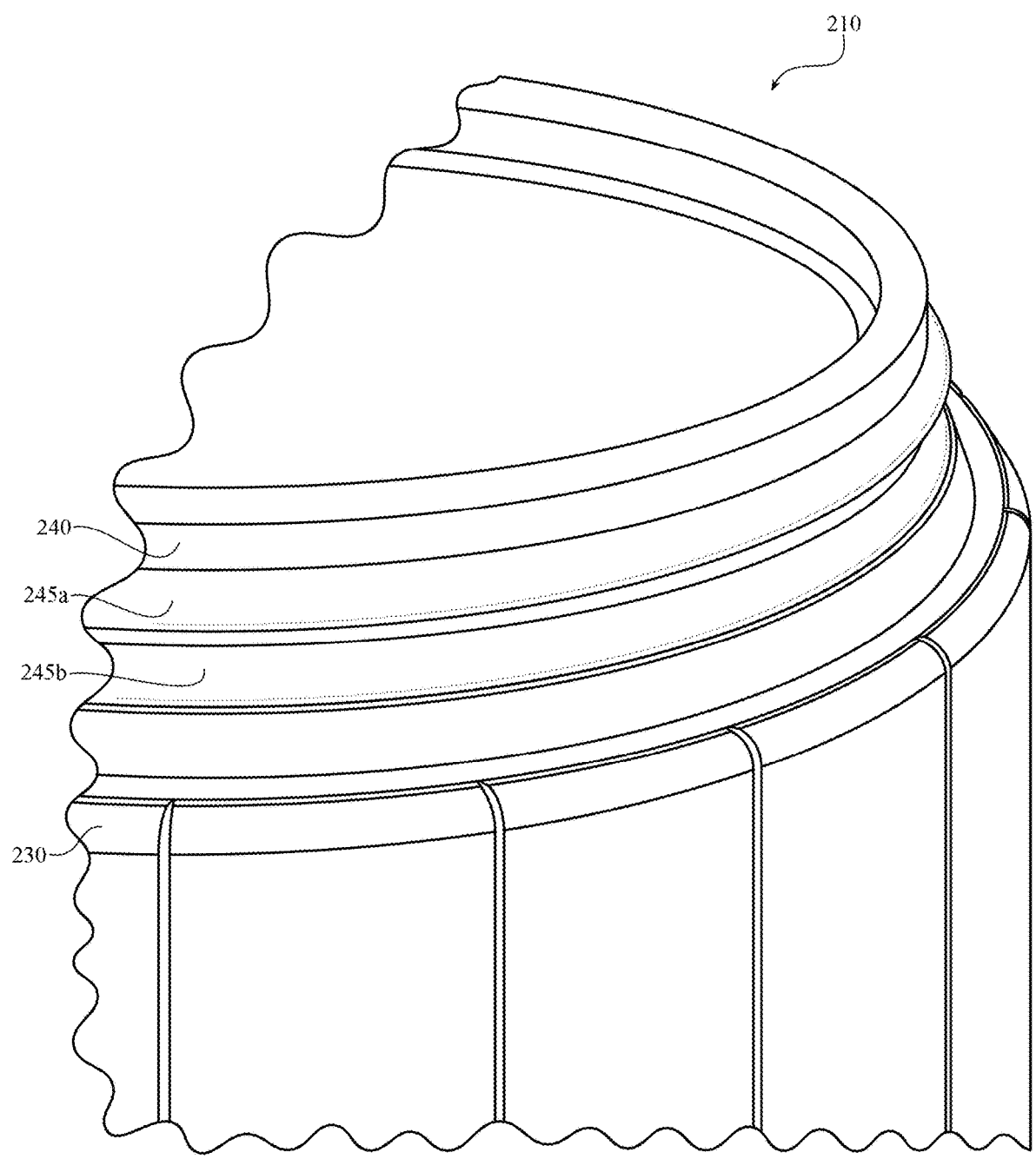
FIG. 2 is a bottom perspective view of a coupling part, in accordance with some embodiments of the present disclosure.

In the embodiment depicted in FIG. 2, a two-part coupling 200 includes receiving coupling 120 as shown in FIG. 1B, and a modified insertable coupling 210. In particular, FIG. 2 shows a magnified view of a bottom end of insertable coupling 210 in which a base portion 240 is configured with one or more circumferential grooves (two shown) into which seals 245a and 245b can be inserted. When two-part coupling 200 is assembled by integrating insertable coupling 210 with receiving coupling 120, seals 245a,b are interposed between receiving coupling 120 and insertable coupling 210. In some embodiments, seals 245a,b are in the form of o-rings made from a flexible, compressible material such as, for example, rubber, silicone, or the like. In some embodiments, other seal types can be used, such as a pressure energized seal that includes multiple materials. Any suitable material, such as, for example, polymers or elastomers, can be used to form seals 245a,b, which can either be added to, or made integral with, the two-part coupling 200. Seals 245a,b can assist in preventing two-part coupling 100 from leaking. The material used in seals 245a,b can depend, for example, on the pressure or viscosity of a liquid flowing through two-part coupling 200 during operation. In other embodiments of the present invention, no o-rings are necessary and the insertable coupling and receiving coupling are held in place in accordance with tolerances, or manufactured from specialized materials such that no additional sealing is necessary.

Figure 3:
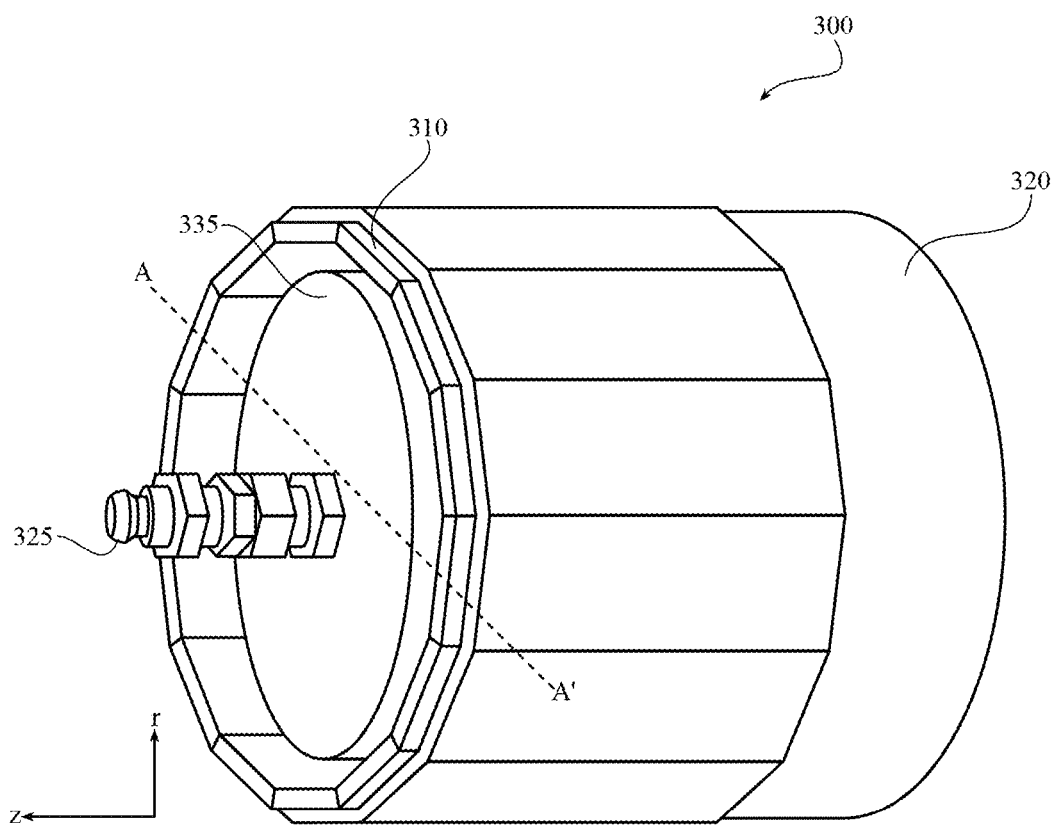
FIG. 3 is a bottom perspective view of an assembled coupling, in accordance with some embodiments of the present disclosure.

Referring to FIG. 3, a magnified view of one end of a fully assembled two-part coupling 300 is shown according to one embodiment of the present invention. Two-part coupling 300 includes insertable coupling 310 and receiving coupling 320. Two-part coupling 300 as shown in FIG. 3 is connected to a fluid source 325, e.g., a water line, for testing. FIG. 3 shows an example in which fluid source 325 can be coupled to a central entry point on an end 335 of assembled two-part coupling 300.

Figure 4:
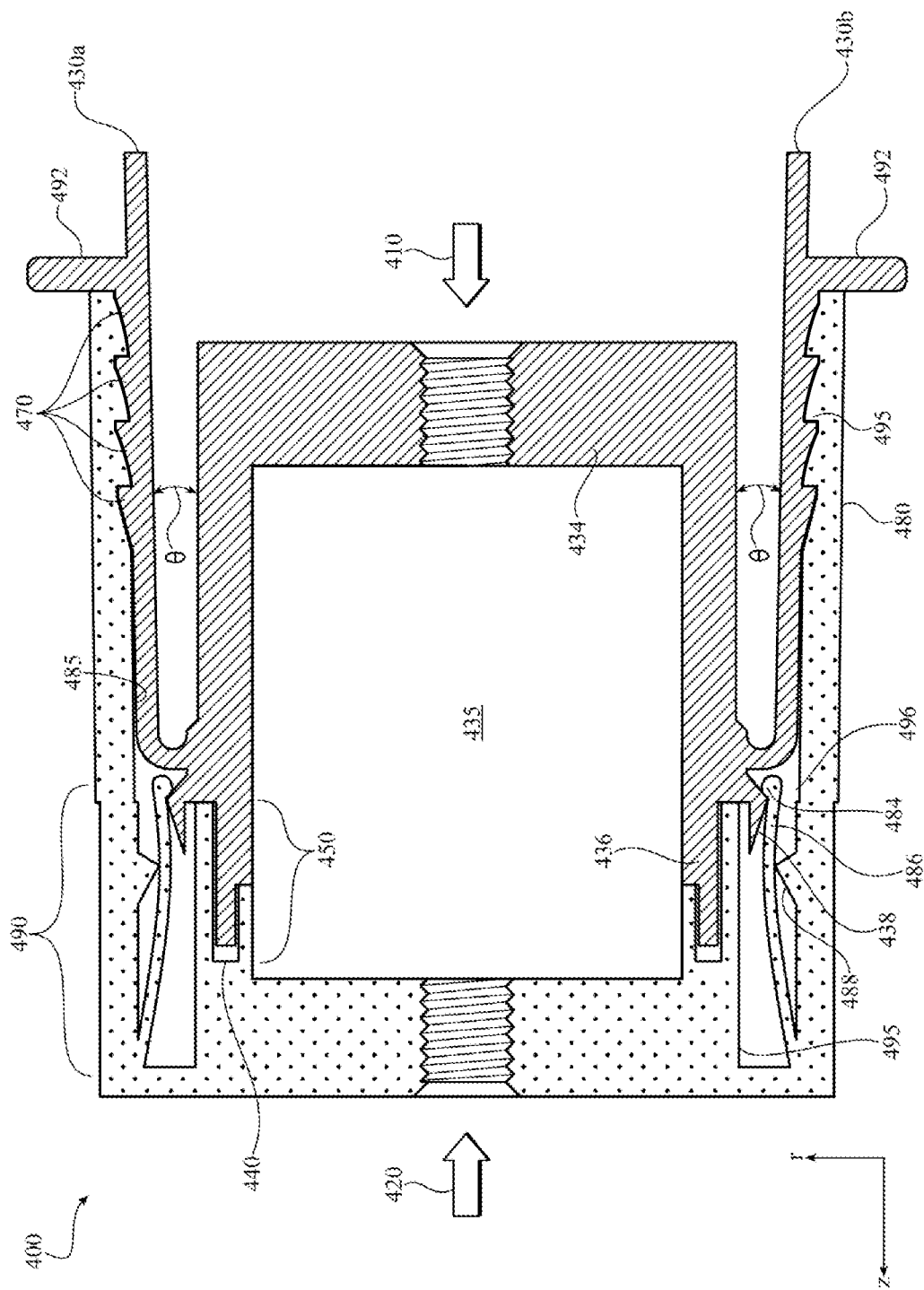
FIG. 4 is a cross-sectional slice of the assembled coupling, along cut line A-A', in accordance with some embodiments of the present disclosure.

Referring to FIG. 4, a cross-sectional slice 400 along cut line A-A' of an embodiment of the present invention is presented. Slice 400 includes an insertable coupling 410 and a receiving coupling 420 joined in an interlocked configuration to surround a central fluid cavity 435. Insertable coupling 410 includes circumferential cantilevered fingers, for example, 430a and 430b, each oriented at an angle θ relative to a central core 434.

In an embodiment of the present invention, wings 492 can optionally be added to the insertable coupling 410. Wings 492 can serve as handles to facilitate manipulation of the insertable coupling 410. Additionally or alternatively, wings 492 can serve to prevent insertable coupling 410 from being inserted into the receiving coupling 420 farther than desired. Accordingly, wings 492 can be positioned on insertable coupling 410 at a predetermined location that serves as a stopping point to facilitate subsequent removal of insertable coupling 410.

The interior view provided in FIG. 4 of insertable coupling 410 further reveals an embodiment with additional integral features not necessarily visible, e.g., in FIG. 1. Such features, which are circumferential elements of two-part coupling 400, include a fixed tab 436 and a triangular retaining feature 438. Fixed tab 436, among other things, provides additional structural support and fluid retention. Specifically, when receiving coupling 420 and insertable coupling 410 are joined, fixed tab 436 slides into a slot 440 in receiving coupling 420 to create a circumferential alignment feature 450 for a face seal. In an alternative embodiment, the alignment feature 450 can include a labyrinth seal to prevent fluid from escaping central fluid cavity 435. In some embodiments, a sealant can also be disposed in slot 440 or fixed tab 436 can have grooves into which one or more seals in the form of o-rings or gaskets, for example, can be disposed. In other embodiments more complex geometries can be used to form a labyrinth seal at the interface between insertable coupling 410 and receiving coupling 420.

The triangular retaining feature 438 provides additional mechanical support to fully assembled two-part coupling 400. In an arrangement according to one embodiment of the present invention, the receiving coupling 420 has an additional interior retention mechanism that interlocks with elements of insertable coupling 410. Specifically, receiving coupling 420 can include a compliant blade 486 interposed between a pair of teeth, the blade having a locking tooth 484 at its tip. The receiving coupling 420 includes a disposing member 488 that biases compliant blade 486 away from the walls of the receiving coupling 410 and toward the insertable coupling 410. Thus, compliant blade 486, when interlocked with triangular feature 438, forms a secondary retaining feature 490 of two-part coupling 400. Secondary retaining feature 490 supplements the primary retaining feature provided by interlocking a first sawtooth structure 470 with a second sawtooth structure 495.

Those of skill will appreciate that depending on the geometry of various embodiments of the present invention, a secondary retaining feature 490 can be considered part of seal alignment feature 450. In some embodiments, the geometry of the secondary retaining feature 490 can provide an additional retention force. In some other embodiments, the secondary retaining feature 490 can be sufficiently engaged to create a latch between insertable coupling 410 and receiving coupling 420 that will only release on failure.

It can be appreciated from FIG. 4 that disassembly of two-part coupling 400 can be achieved by flexing circumferential cantilevered fingers 430a and 430b together so as to decrease angle θ. Thus, disengaging operation of two-part coupling 400 can be accomplished by applying a radial force in the −r direction (i.e., toward the center) to circumferential cantilevered fingers 430a and 430b to release insertable coupling 410 from receiving coupling 420. With this configuration, two-part coupling 400 can be reversibly joined without the need for fasteners or tools. Likewise, joining insertable coupling 410 to receiving coupling 420 by sliding the two parts together can be accomplished by applying an axial force in the z-direction to central core 434. Those of skill will understand that one embodiment of the coupling can be joined or separated using a device or simple tool akin to a strap wrench or chain wrench. In this way, engagement or disengagement of the two-part coupling 400 can be automated to minimize human involvement or even take place in a completely automated way.

It is noted that the angle θ is a small angle, such that circumferential cantilevered fingers 430a and 430b need only flex slightly when joining or separating insertable coupling 410 and receiving coupling 420 from one another. Minimal flexure reduces the chance of failure due to plastic deformation of integral features of two-part coupling 400. Further, it will be appreciated that the cantilevered members 435a and 435b are designed to flex without permanently changing geometry, so embodiments of the present invention are advantageously formed such that the cantilevered members are subject only to elastic deformation and not to plastic deformation as insertable coupling 410 is inserted into receiving coupling 420.

It is also envisioned that, in some aspects, an embodiment of the present invention can include an additional wedge removably interposed between central core 434 and cantilevered fingers 430a, 430b. Such a wedge would additionally bias cantilevered fingers 430a and 430b to increase the engagement between sawtooth features 470 and corresponding detent structures 495.

Figure 5:
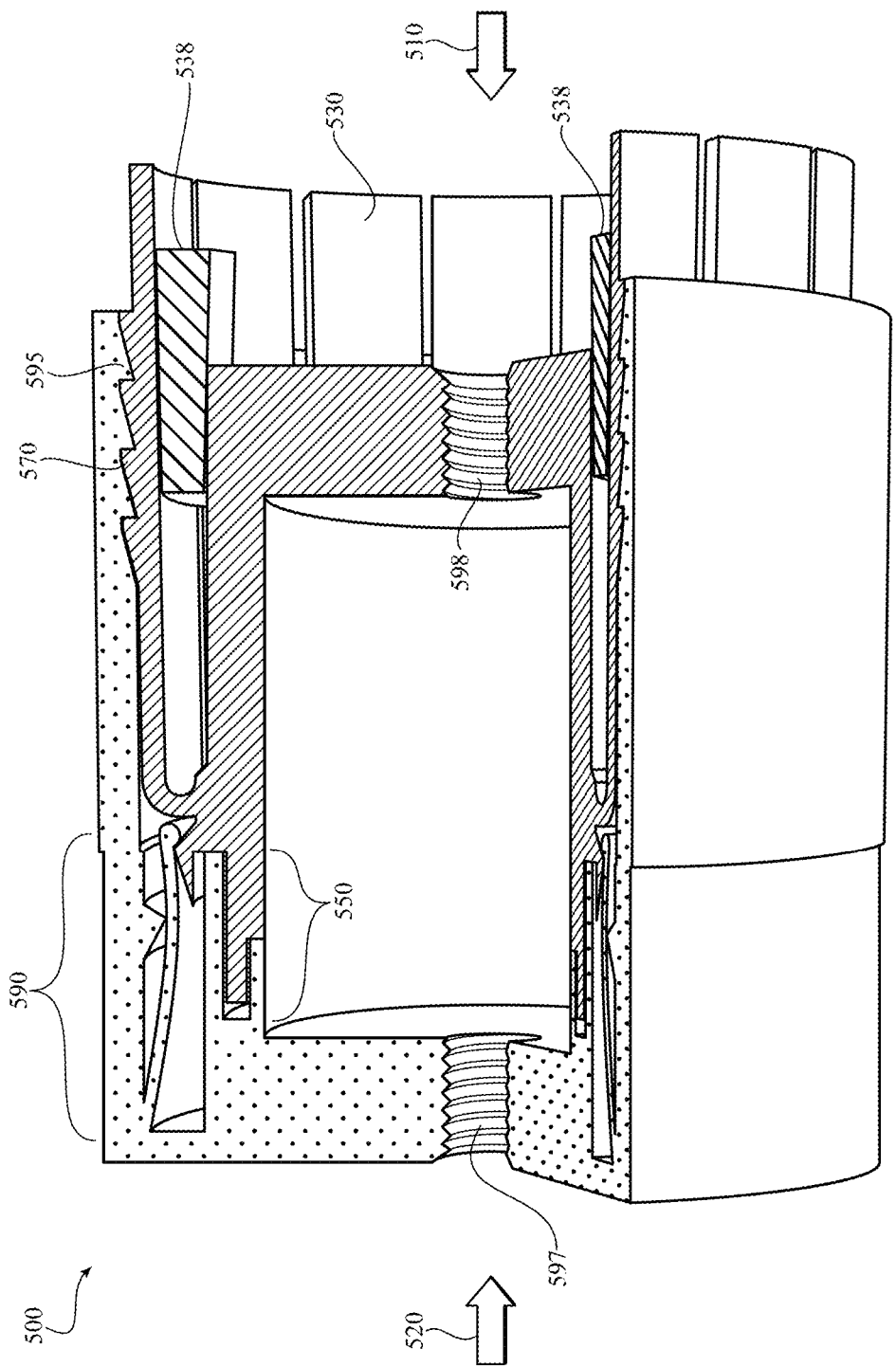
FIG. 5 is a cutaway view of the interior of an assembled coupling, in accordance with some embodiments of the present disclosure.

Referring to FIG. 5, a cutaway 3-D view of an assembled two-part coupling 500 is shown, according to one embodiment. Two-part coupling 500 includes a receiving coupling 520 and a insertable coupling 510 that includes circumferential cantilevered fingers 530. The cutaway 3-D view shows curvature of the exterior surfaces of receiving coupling 520 and insertable coupling 510 while also showing interior integral features corresponding to those shown in FIG. 4 and described above, including a seal alignment feature 450 550, a secondary retaining feature 590, and interlocking sawtooth features 570 and detent structure 595. In addition, FIG. 5 shows input and output channels 597 and 598 for coupling two-part coupling 500 to a source of fluid (e.g., an external pipe) such as fluid source 325 shown in FIG. 3.

Figure 6:
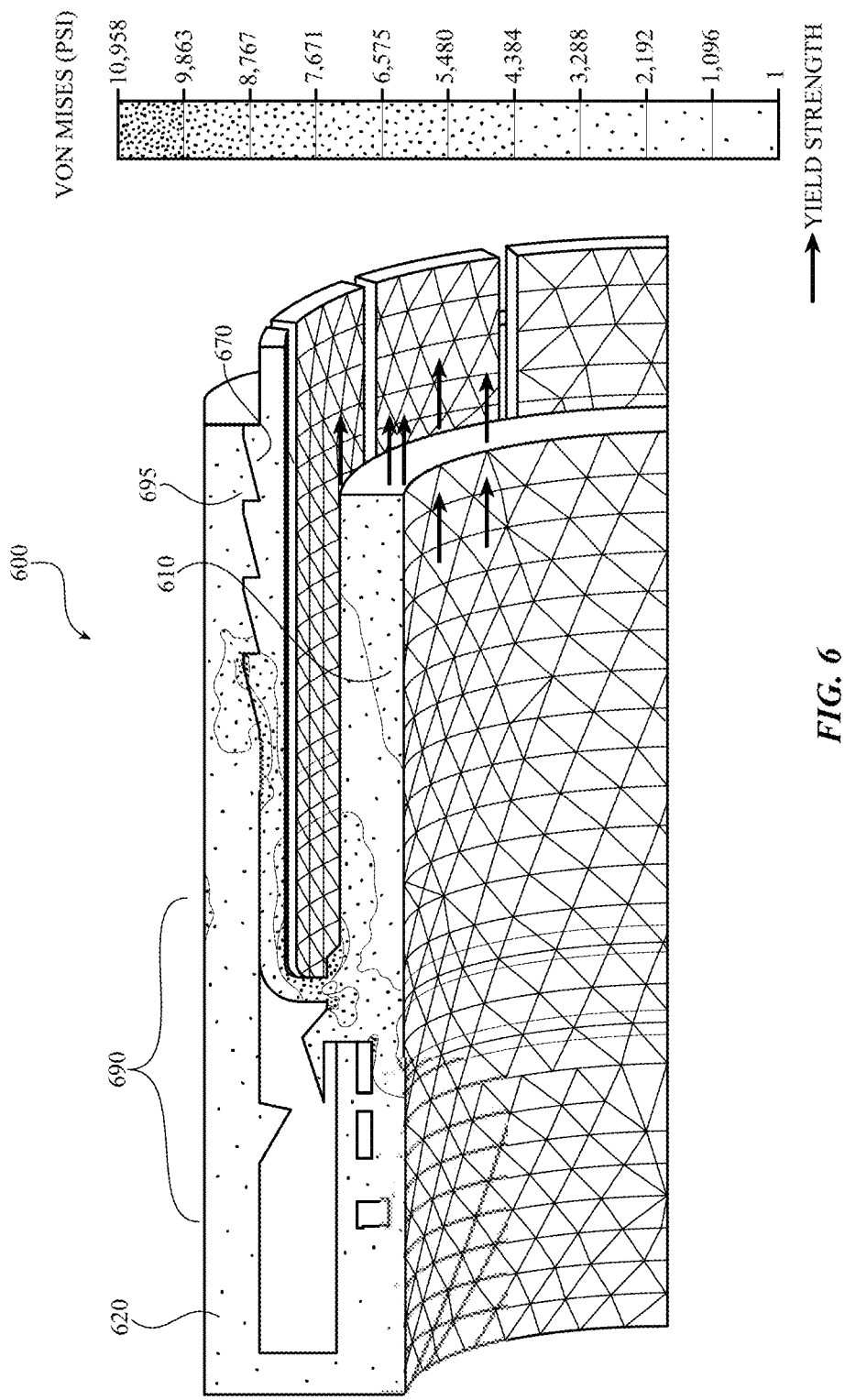
FIG. 6 is a simulated quarter cutaway view along cut line A-A' of a wall of the assembled coupling, in accordance with some embodiments of the present disclosure.

Referring to FIG. 6, a quarter of a cutaway 3-D view of a two-part coupling 600 according to one embodiment is shown. Two-part coupling 600 includes a receiving coupling 620 and a insertable coupling 610. Two-part coupling 600 is shown in FIG. 6 along with simulation results showing forces exerted by a fluid on interior features of receiving coupling 620 and insertable coupling 610. Arrows indicate the direction of the applied forces during a simulation in which a load is applied to insertable coupling 610 while receiving coupling 620 is held static. It will be appreciated that the geometry of the two-part coupling 600 means that in some embodiments the direction of the fluid flow will not affect the direction of the applied forces. In particular, relative internal stresses on secondary retaining feature 690 and interlocking sawtooth features 670 and 695 are shown. As is evident from FIG. 6, the forces applied to one embodiment of the present invention show substantially all of the excess forces concentrated in the portions of the cantilevered members engaged with the detent structure 695.

Figure 7:
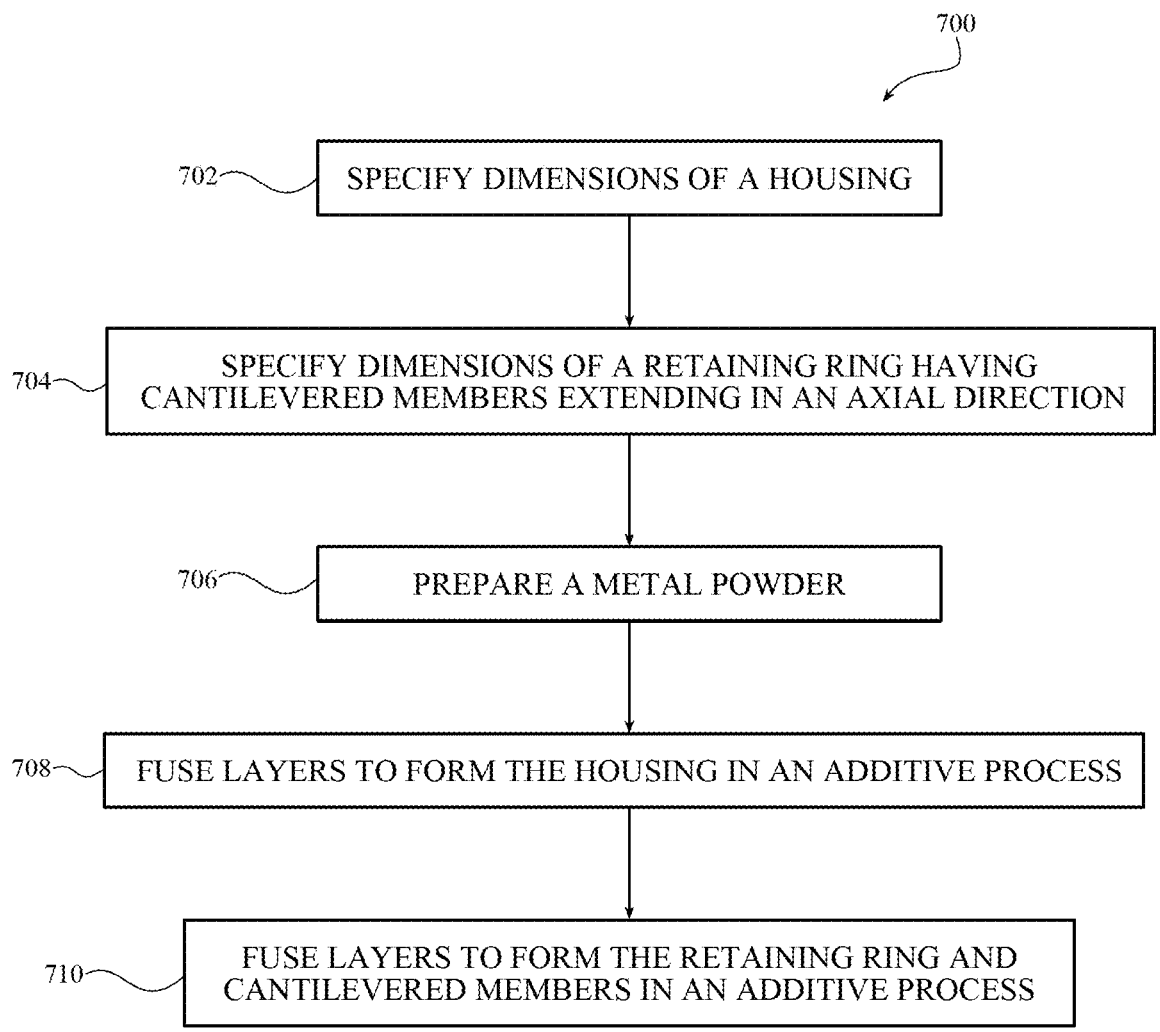
FIG. 7 is a flow diagram of a method for fabricating coupling parts, in accordance with some embodiments of the present disclosure.

Referring to FIG. 7, a flow diagram of a method 700 for fabricating two-part coupling 100 is shown, according to some embodiments.

Referring to FIG. 7, in operation 704, the design and associated dimensions of the receiving coupling in any one of the embodiments described herein, e.g., receiving coupling 120 as shown in FIG. 1A, are specified by design, using additive manufacturing system 900, for additive manufacture of coupling 940. It will be understood that the descriptions of FIG. 7 are with reference to FIG. 1A but apply equally to a wide variety of other embodiments of the present invention. The design and associated dimensions of receiving coupling 120 will depend on the particular application of two-part coupling 100. The design and associated dimensions can be specified, for example, via user input/output devices 903 and stored in secondary memory 910 or in removable storage units 918, 922, for communication to 3-D printer 930 via communications infrastructure 906. The design and associated dimensions of receiving coupling 120 can be determined or influenced by numerical simulations such as the simulation depicted in FIG. 6 above. In some embodiments, numerical simulations can be executed by processor 904 and the simulation results can be stored in secondary memory 910, or directly communicated to 3-D printer 930 via communication infrastructure 906. The design and associated dimensions of receiving coupling 120 can be further informed by test data gathered from testing a prototype of receiving coupling 120 separately, or by testing a prototype of assembled two-part coupling 100, including receiving coupling 120, such as the water test depicted in FIG. 3 above.

Referring to FIG. 7, in operation 704, the design and associated dimensions of the insertable coupling of any one of the embodiments described herein, e.g., as shown in FIG. 1A, are specified by design, using additive manufacturing system 900, for additive manufacture of a two-part coupling product 940. The design and associated dimensions of insertable coupling 110 will depend on the particular application of two-part coupling 100. The design and associated dimensions can be specified, for example, via user input/output devices 903 and stored in secondary memory 910 or in removable storage units 918, 922, for communication to 3-D printer 930 via communications infrastructure 906. The design and associated dimensions of insertable coupling 110 can be determined or influenced by numerical simulations such as the simulation depicted in FIG. 6 above. In some embodiments, numerical simulations can be executed by processor 904 and the simulation results can be stored in secondary memory 910, or directly communicated to 3-D printer 930 via communication infrastructure 906. The design and associated dimensions of insertable coupling 110 can be further informed by test data gathered from testing a prototype of insertable coupling 110 separately, or by testing a prototype of assembled two-part coupling 100, including insertable coupling 110, such as the water test depicted in FIG. 3 above.

Referring to FIG. 7, in operation 706, a raw material 920 is prepared and provided to 3-D printer 930 for additive manufacturing of a two-part coupling product 940. In some embodiments, raw material 920 is provided by a user in the form of a metal powder. In some embodiments, the metal powder can contain additional components such as binders or adhesives. In some embodiments, raw material 920 can contain a single metal component or multiple metal components such as, for example, aluminum, titanium, scandium, nickel, chromium, copper, stainless steel (e.g., SS316), and the like, and combinations thereof. In some embodiments, the metal powder can contain ferromagnetic metal components such as iron, cobalt, or combinations thereof. In some embodiments, the metal powder can contain ferroelectric metal components such as lead, zirconium, oxides of titanium, barium, aluminum nitride (AlN), and combinations thereof such as PZT. Alternatively, insertable coupling 110 and receiving coupling 120 can be fabricated by additive manufacturing, from a raw material in the form of a powder made from nylon, plastic, fiberglass, carbon fiber, or another non-metallic material.

Referring to FIG. 7, in operations 708 and 710, layers of raw material 920 in powdered form can be fused, in 3-D printer 930, to form the receiving coupling and the insertable coupling of the two-part coupling in an additive process. Fusing layers of the raw material 920 can be accomplished using a focused energy source such as, for example, a laser beam, e.g., using laser powder bed fusion (LPBF). Additionally or alternatively, fusing layers of the raw material 920 can be accomplished by directed energy deposition (DED), using a directed heat source to melt raw materials 920.

Additionally or alternatively, fusing layers of the raw material 920 can be accomplished by wire arc additive manufacturing (WAAM), which uses a heated wire to build up layers of metal on top of each other. WAAM can be carried out by a robot to which a torch and a wire are attached. By changing the type of wire, different metal materials can be incorporated into an additive manufactured object. In some embodiments, WAAM can be an appropriate technique for fusing layers of raw material 920 to create the complex shapes that are integral to the receiving coupling and the insertable coupling of the two-part coupling. WAAM can be used either to create the part as a whole, or to create only the complex portions of the part. One advantage of WAAM is that it is scalable to create parts that are larger than a cubic meter at a low cost and a high deposition rate.

Figure 8A:
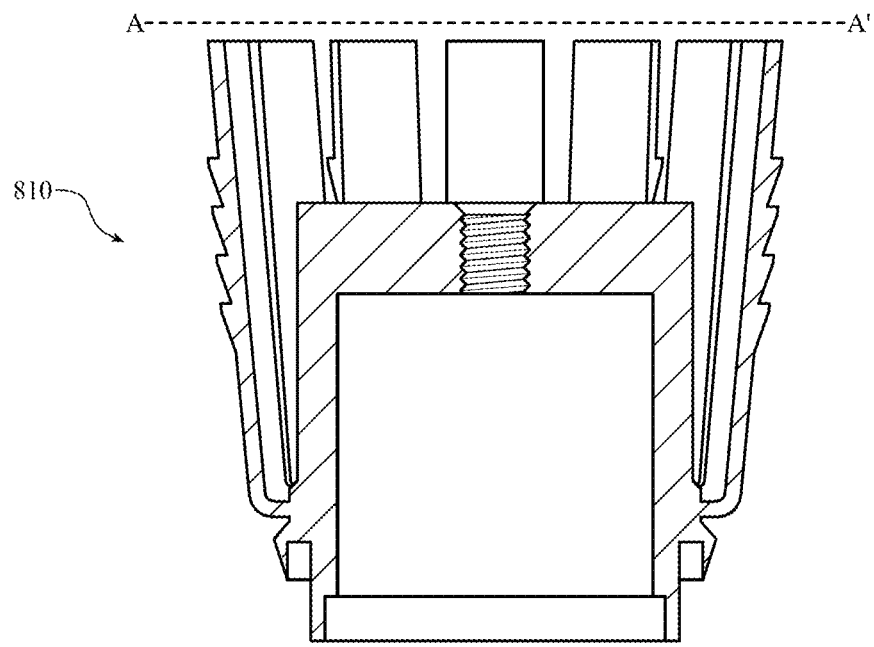
FIGS. 8A and 8B are design drawings showing cross-sectional views of coupling parts, in accordance with some embodiments of the present disclosure.
Figure 8B:
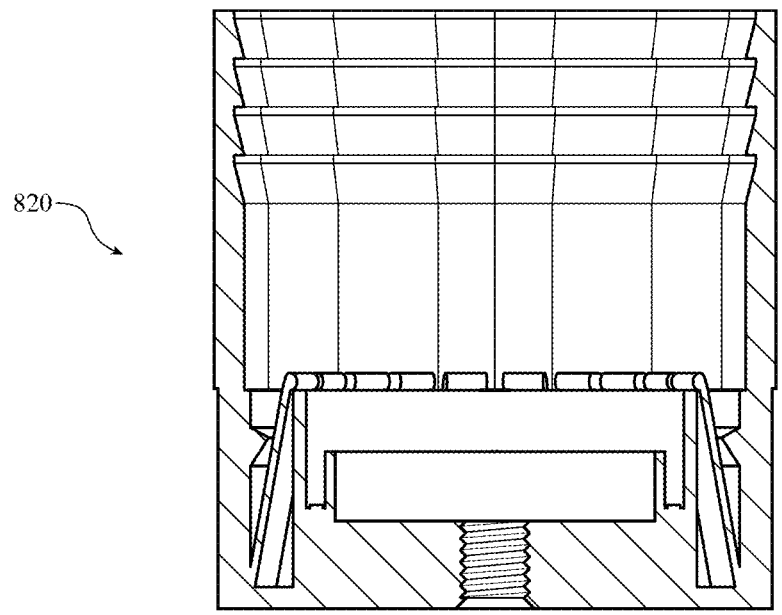

Referring to FIGS. 8A and 8B, design drawings 810 and 820 illustrate a way to specify dimensions of all of the integral features of insertable coupling 810 and receiving coupling 820 for input into 3-D printer 930. For example, a computer aided design (CAD) system used to simulate and test design attributes of two-part coupling 800 as indicated in FIG. 6 can also be used as an input platform to communicate dimensions of a structure to be fabricated by 3-D printer 930. When a successful simulation is identified, the data that produced the desired simulation run can be output from the CAD system, transferred to additive manufacturing system 900, and stored in memory for transfer to 3-D printer 930 along with raw material 920 when raw material 920 is available. Dimensions provided by the CAD system to additive manufacturing system 900 can also be used to calculate an amount of raw material 920 needed to fabricate two-part coupling 100.

Figure 9:
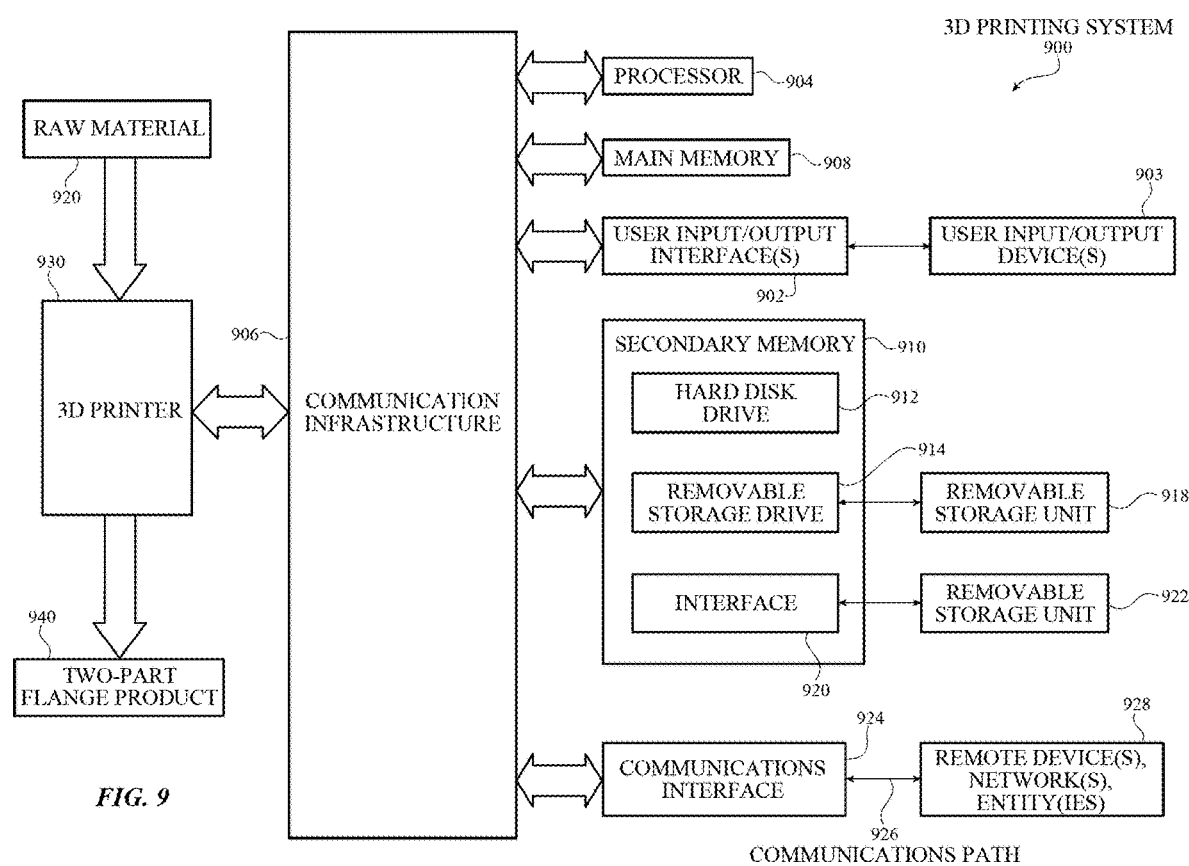
FIG. 9 is a block diagram of an additive manufacturing system for producing coupling parts in accordance with some embodiments of the present disclosure.

Referring to FIG. 9, a block diagram of an additive manufacturing system 900 is shown, according to some embodiments. Additive manufacturing system 900 can serve to implement various embodiments of the present disclosure. Additive manufacturing system 900 is a specialized computer system capable of performing additive manufacturing functions and operations as described herein. Additive manufacturing system 900 can be used, for example, to execute one or more operations in method 700, which describes an example method for fabricating two-part coupling 100 by a 3-D printer 930. For example, and without limitation, 3-D printer 930 within additive manufacturing system 900 can be capable of fabricating objects from a raw material 920, according to a specified design. 3-D printer 930 outputs a physical product 940 including, for example, two-part coupling 100.

Additive manufacturing system 900 includes one or more processors (also called central processing units, or CPUs), such as a processor 904. Processor 904 is connected to a communication infrastructure or bus 906. Additive manufacturing system 900 also includes input/output devices 903, such as monitors, keyboards, pointing devices, etc., that communicate with communication infrastructure or bus 906 through input/output interfaces 902. 3-D printer 930 can receive instructions to implement functions and operations described herein—e.g., method 700 of FIG. 7—via input/output devices 903. Additive manufacturing system 900 also includes a main or primary memory 908, such as random access memory (RAM). Main memory 908 can include one or more levels of cache. Main memory 908 has stored therein control logic (e.g., computer software) or data. In some embodiments, the control logic (e.g., computer software) or data can include one or more of the operations described above with respect to method 700 of FIG. 7.

Additive manufacturing system 900 can also include one or more secondary storage devices or memory 910. Secondary memory 910 can include, for example, a hard disk drive 912 or a removable storage device or drive 914. Removable storage drive 914 can be a floppy disk drive, a magnetic tape drive, a compact disk drive, an optical storage device, tape backup device, or any other storage device/drive.

Removable storage drive 914 can interact with a removable storage unit 918. Removable storage unit 918 includes a computer usable or readable storage device having stored thereon computer software (control logic) or data. Removable storage unit 918 can be a floppy disk, magnetic tape, compact disk, DVD, optical storage disk, and any other computer data storage device. Removable storage drive 914 reads from or writes to removable storage unit 918 in a well-known manner.

According to some embodiments, secondary memory 910 can include other means, instrumentalities or other approaches for allowing computer programs or other instructions or data to be accessed by additive manufacturing system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, or any other removable storage unit and associated interface. In some embodiments, secondary memory 910, removable storage unit 918, or removable storage unit 922 can include one or more of the operations described above with respect to method 700 of FIG. 7.

Additive manufacturing 900 can further include a communication or network interface 924. Communication interface 924 enables additive manufacturing system 900 to communicate and interact with any combination of remote devices, remote networks, remote entities, etc. (individually and collectively referenced by reference number 928). For example, communication interface 924 can allow additive manufacturing system 900 to communicate with remote devices 928 over communications path 926, which can be wired or wireless, and which can include any combination of LANs, WANs, the Internet, etc. Control logic or data can be transmitted to and from additive manufacturing system 900 via communication path 926.

Inputs to additive manufacturing system 900 include a design specification that can be stored by a designer in any of the memory or storage modules shown in FIG. 9 and communicated to 3-D printer 930 via communication infrastructure 906.

The operations in the preceding embodiments can be implemented in a wide variety of configurations and architectures. Therefore, some or all of the operations in the preceding embodiments—e.g., method 700 of FIG. 7—can be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, additive manufacturing system 900, main memory 908, secondary memory 910 and removable storage units 918 and 922, as well as tangible articles of manufacture embodying any combination of the foregoing. Such control logic, when executed by one or more data processing devices (such as additive manufacturing system 900), causes such data processing devices to operate as described herein.

It will further be understood that those of skill in the art that embodiments of the present invention can be manufactured using additive manufacturing techniques such as laser powder bed fusion or wire arc additive manufacturing.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A coupling assembly comprising:
an insertable coupling, having a base and a plurality of flexible circumferential cantilevered members integral to and extending away from the base, the flexible circumferential cantilevered members having exterior surfaces bearing a substantially sawtooth profile;
a receiving coupling comprising an interior surface adapted to engage the substantially sawtooth profile; and
the insertable coupling configured to be retained within the receiving coupling by radial compression of the flexible circumferential cantilevered members,
wherein the substantially sawtooth profile of the flexible circumferential cantilevered members comprises a plurality of concave surfaces and the interior surface of the receiving coupling comprises a plurality of convex surfaces.

2. The coupling assembly of claim 1 wherein the flexible circumferential cantilevered members comprise one or more of aluminum, nickel, copper, stainless steel, titanium, and alloys thereof.

3. The coupling assembly of claim 1 wherein the substantially sawtooth profile protrudes from the exterior surfaces of the flexible circumferential cantilevered members.

4. The coupling assembly of claim 3 wherein the interior surface further comprises a flat portion and a grooved portion.

5. The coupling assembly of claim 1 further comprising a seal disposed between the base of the insertable coupling and the receiving coupling.

6. The coupling assembly of claim 5 wherein the seal is an o-ring.

7. The apparatus of claim 1 wherein one or both of the receiving coupling and the circumferential cantilevered members is flexible.

8. A coupling assembly, comprising:
an insertable coupling comprising a base and a plurality of integral cantilevered members extending therefrom, the integral cantilevered members comprising a first engaging structure on an outside surface; and
a receiving coupling comprising a second engaging structure on an inside surface configured to engage with the first engaging structure,
wherein the insertable coupling and the receiving coupling are configured to be interconnected, and
wherein the first engaging structure comprises a plurality of concave surfaces and the second engaging structure comprises a plurality of convex surfaces.

9. The coupling assembly of claim 8 wherein the integral cantilevered members are metallic.

10. The coupling assembly of claim 8 wherein the first engaging structure comprises a first sawtooth structure and the second engaging structure comprises a second sawtooth structure.

11. The coupling assembly of claim 8 further comprising a seal disposed between the insertable coupling and the receiving coupling.

12. The coupling assembly of claim 8 wherein the receiving coupling is rigid and the integral cantilevered members are flexible.

13. An apparatus, comprising:
a first cylindrical coupling having flexible members;
a second cylindrical coupling;
the first cylindrical coupling configured to reversibly join to the second cylindrical coupling when the flexible members are radially compressed; and
the second cylindrical coupling configured to reversibly retain the first coupling,
wherein the first and second cylindrical couplings are configured to mate with one another by sliding until an interior surface of the second cylindrical coupling engages at least a retention feature of the first cylindrical coupling, and
wherein the retention feature of the first cylindrical coupling comprises a plurality of concave surfaces and the interior surface of the second cylindrical coupling comprises a plurality of convex surfaces.

14. The apparatus of claim 13 wherein the first and second cylindrical couplings together form a portion of a structure suitable for containing a fluid under pressure, thermal stress, or vibrational stress.

15. The apparatus of claim 13 wherein the retention feature comprises a series of locking arms in a sawtooth configuration.

16. The apparatus of claim 13 wherein the first cylindrical coupling engages an interior retention mechanism of the second cylindrical coupling.

17. The apparatus of claim 16 wherein the interior retention mechanism comprises a compliant blade interposed between a pair of teeth.

\* \* \* \* \*

UNITED STATES PATENT AND TRADEMARK OFFICE
CERTIFICATE OF CORRECTION

| | |
|---|---|
| PATENT NO. | : 12,018,786 B2 |
| APPLICATION NO. | : 17/850869 |
| DATED | : June 25, 2024 |
| INVENTOR(S) | : Fillo et al. |

It is certified that error appears in the above-identified patent and that said Letters Patent is hereby corrected as shown below:

In the Claims

In Column 12, Claim 7, Line 50, delete "apparatus" and replace with --coupling assembly--;

In Column 12, Claim 7, Line 52, delete "is" and replace with --are--.

Signed and Sealed this
Third Day of September, 2024

Katherine Kelly Vidal
*Director of the United States Patent and Trademark Office*